United States Patent [19]
Wright et al.

[11] Patent Number: 6,152,537
[45] Date of Patent: *Nov. 28, 2000

[54] SYSTEM FOR ATTACHING A WHEEL LINER TO A WHEEL USING A CLIP

[75] Inventors: James P. Wright; Garry Rodgers; Timothy L. Bates, all of Cookeville, Tenn.

[73] Assignee: Phoenix USA, Inc., Cookeville, Tenn.

[ * ] Notice: This patent is subject to a terminal disclaimer.

[21] Appl. No.: 08/920,176

[22] Filed: Aug. 25, 1997

[51] Int. Cl.$^7$ ...................................................... B60B 7/06
[52] U.S. Cl. .................................... 301/37.31; 301/37.34; 301/37.37
[58] Field of Search ................................ 301/37.1, 37.31, 301/37.34, 37.35, 37.36, 37.37, 108.1, 108.4

[56] References Cited

U.S. PATENT DOCUMENTS

| | | |
|---|---|---|
| 2,037,237 | 4/1936 | Horn ................................ 301/37.31 X |
| 2,368,251 | 1/1945 | Lyon ..................................... 301/37.31 |
| 2,526,026 | 10/1950 | Horn ..................................... 301/37.34 |
| 2,920,921 | 1/1960 | Lyon ..................................... 301/37.31 |
| 4,357,053 | 11/1982 | Spisak .............................. 301/108.1 X |
| 4,460,219 | 7/1984 | Sepanik ................................ 301/108.1 |
| 4,470,638 | 9/1984 | Bartylla ........................... 301/37.37 X |
| 4,793,658 | 12/1988 | Brown .................................. 301/37.36 |
| 5,358,313 | 10/1994 | Polka ................................. 301/108.4 X |

*Primary Examiner*—Russell D. Stormer
*Attorney, Agent, or Firm*—Waddey & Patterson, P.C.; Edward D. Lanquist, Jr.

[57] ABSTRACT

The present invention discloses a clip mechanism having a first clip and a second clip and a crossed orientation. This crossed clip mechanism has opposed ends which are biased to frictionally or biasedly grasp the lip of a hub or the hub itself. If the lip of the hub is not available, holes can be placed in the opposed ends to receive the bolts on the face of the hub. The opposed ends also extend outwardly to be releasibly received by the inside of the hub cover.

4 Claims, 5 Drawing Sheets

SYSTEM FOR ATTACHING A WHEEL LINER TO A WHEEL USING A CLIP

BACKGROUND OF THE INVENTION

The present invention relates generally to automobile products and more particularly to a system for attaching a liner to a wheel using a spring clip.

It will be appreciated by those skilled in the art that individuals having wheels often wish to place ornamental features over their wheels. These ornamental features are in the form of a wheel liner or wheel trim system. In the long past, wheel liners were attached underneath the lugs of wheels. Unfortunately, for access purposes and for safety purposes, individuals now wish to be able to attach the wheel liner to the wheel without removing the lug nuts.

Additionally, it will be appreciated by those skilled in the art that rear wheels on larger vehicles such as trucks often have an exposed hub. These hubs perform many features including access for greasing as well as holding the wheel attachment assembly to an axle. As a result, many individuals have attempted to provide something to cover the wheel. However, for maintenance and inspection purposes, whatever system is used to cover the hub must be easily removed What is needed, then, is a system for attaching a wheel liner to a wheel This needed system must be capable of releasibly attaching a wheel liner to a wheel. This system must allow a hub cover to be releasibly attached to a hub by easy inspection. This system is presently lacking in the prior art.

SUMMARY OF THE INVENTION

The present invention discloses a clip mechanism having a first clip and a second clip and a crossed orientation. This crossed clip mechanism has opposed ends which are biased to frictionally or biasedly grasp the lip of a hub or the hub itself. If the lip of the hub is not available, holes can be placed in the opposed ends to receive the bolts on the face of the hub. The opposed ends also extend outwardly to be releasibly received by the inside of the hub cover.

Accordingly, one object of the present invention is to provide a system for attaching a liner to a wheel.

Another object of the present invention is to provide a system for attaching a liner to a wheel without removing any of the existing lug nuts.

Another object of the present invention is to provide a system for releasibly attaching a hub cover to a hub.

Another object of the present invention is to provide a hub cover which can be easily removed for inspection and maintenance purposes.

Another object of the present invention is to provide a system which is sufficiently universal so that it may be used in connection with a hub having a lip or not having a lip.

DESCRIPTION OF THE PREFERRED EMBODIMENTS

Figure 1:
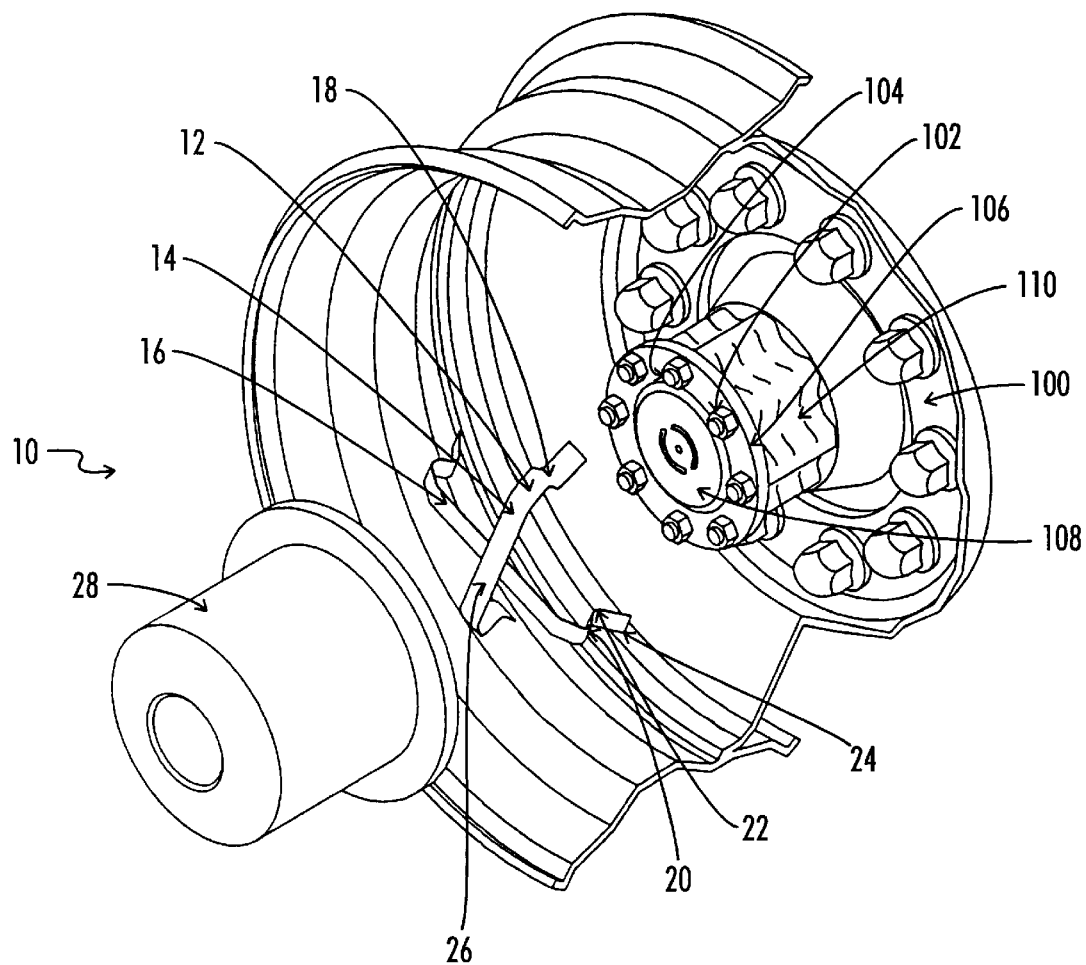
FIG. 1 is a perspective exploded view of one embodiment of the present invention.
Figure 2:
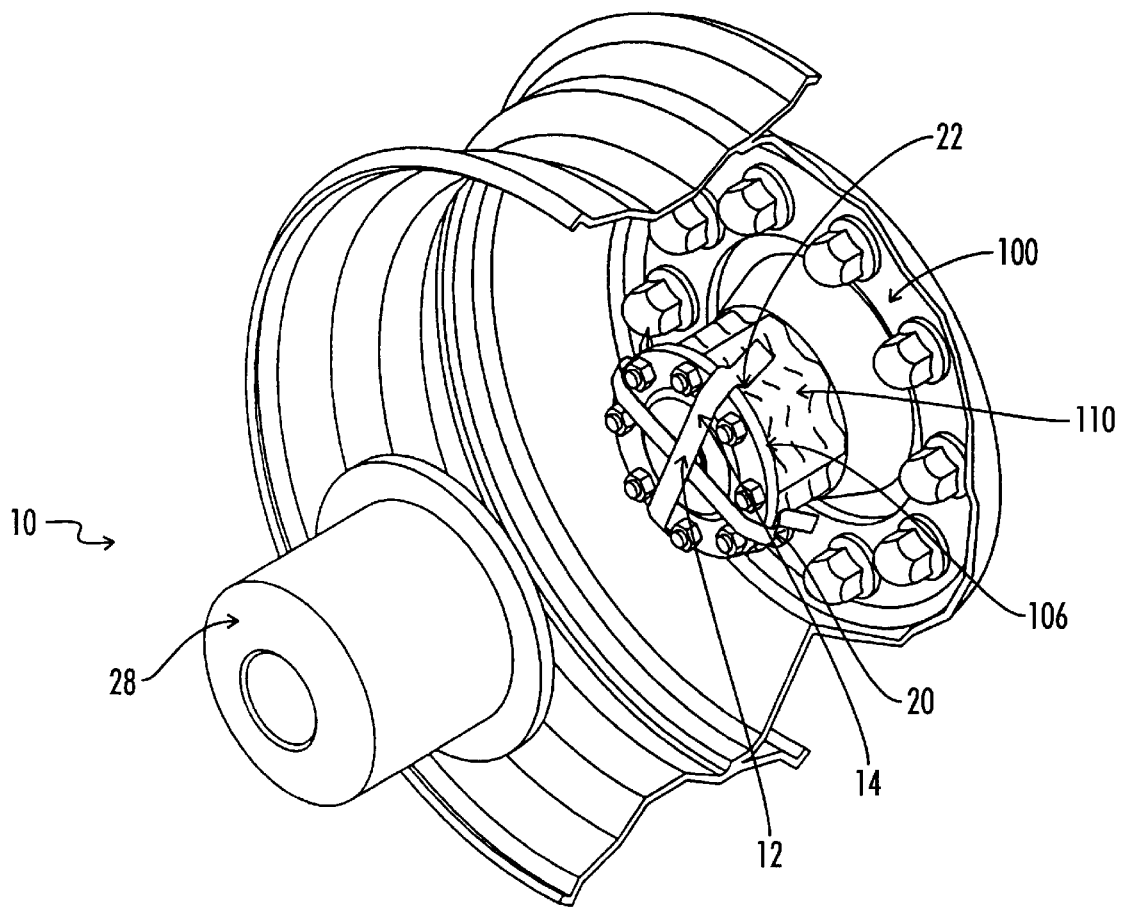
FIG. 2 is a perspective exploded view of the system shown in FIG. 1.

Referring now to FIGS. 1 and 2, there is shown generally at 10 the system for attaching a wheel liner to a wheel of the present invention. In this particular embodiment, wheel 100 has hub 110 having lip 106 exposing outwardly proximal face 108 of hub 110. On face 108 there are also provided existing nuts 102 which receive existing bolts 104. System 10 has clip mechanism 12 which has crossed first clip 14 and second clip 16. In the preferred embodiment, clips 14 and 16 are perpendicular to one another. However, any orientation can be provided as long as sufficient support is provided in all directions. Clips 14 and 16 can be welded together or unitarily manufactured as one piece or can be separated from one another. Each clip 14 and 16 have opposing ends 18 joined by bracket 26. Opposing ends 18 have outward curve 20, inward curve 22, and flange 24. Outward curve 20 is provided not only to clear lip 106 but also to, in some cases, frictionally engage the interior of hub cover 28. Inward curve 22 is provided to frictionally engage hub 110. Flange 24 is provided to provide additional frictional attachment to inside of hub 110.

Figure 3:
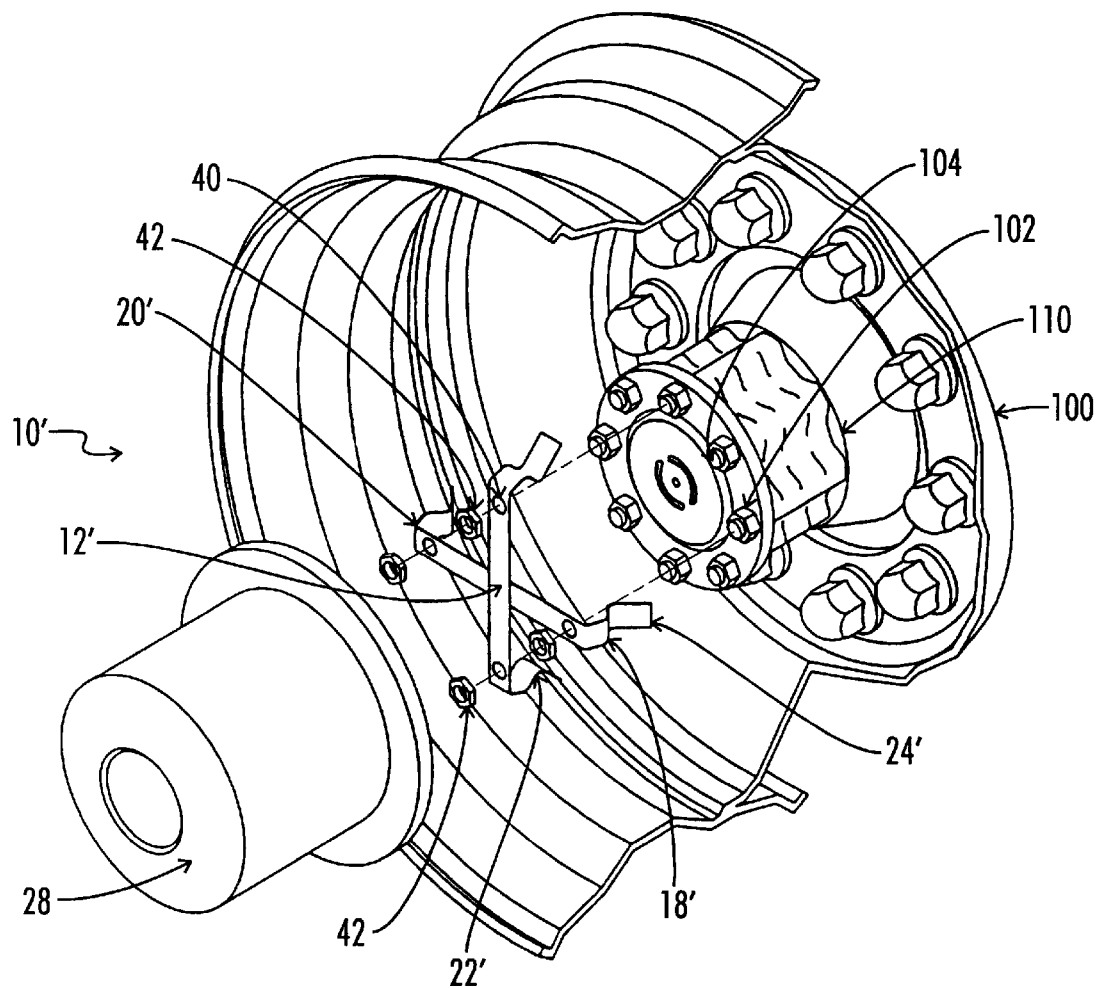
FIG. 3 is a perspective exploded view of another embodiment of the present invention.
Figure 4:
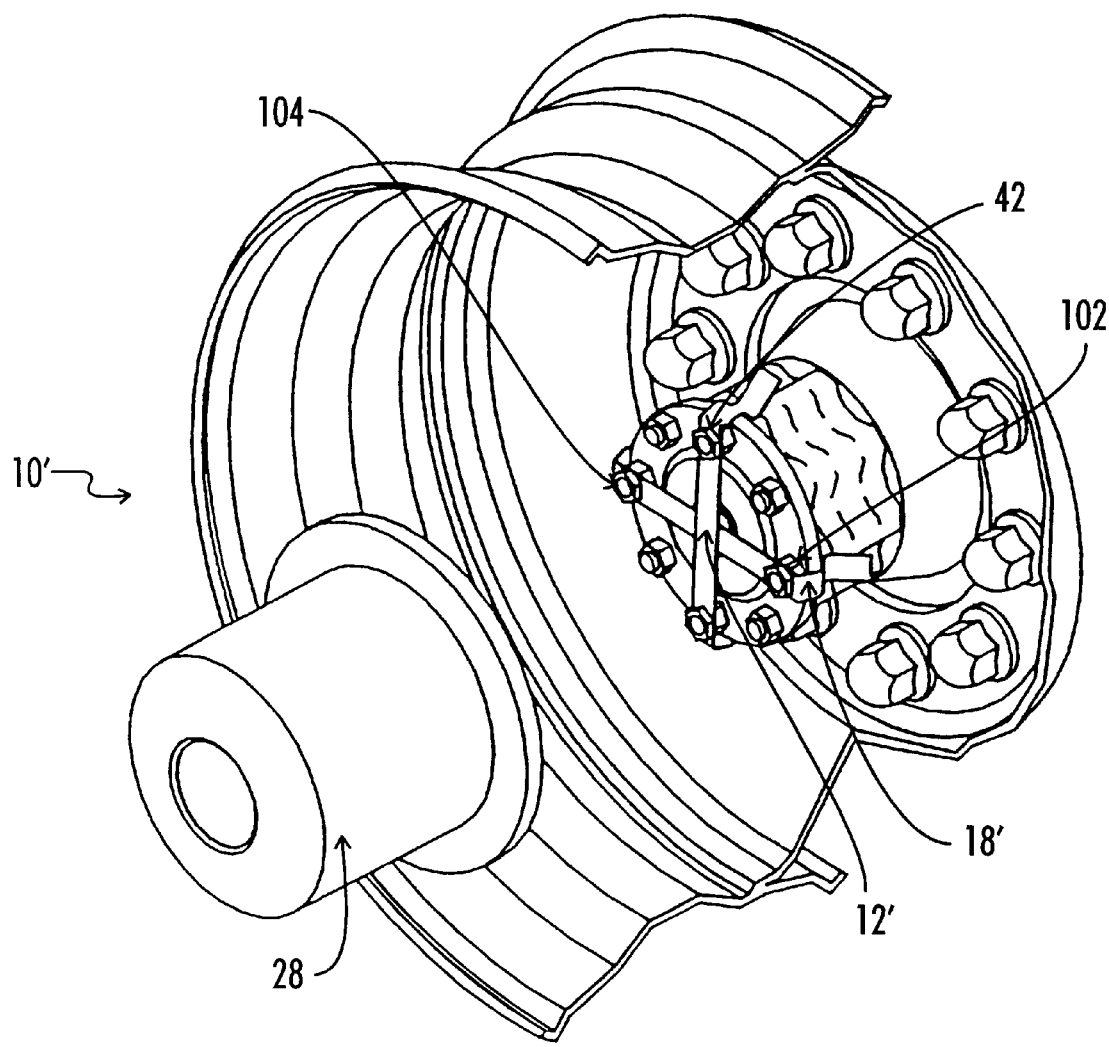
FIG. 4 is a perspective exploded view showing the clip mechanism attached to the hub.

Referring now to FIGS. 3 and 4, there is shown generally at 10' another embodiment of the present invention. In this particular embodiment, holes 40 are placed in opposed ends 18'. Holes 40 can receive bolts 104 without removal of nuts 102. Jam nuts 42 then receive bolts 104 to attach clip mechanism 12' to hub 110. Hub cover 28 can then be placed over clip mechanism 12' and held in place by either outward curve 20' or flange 24'.

Figure 5:
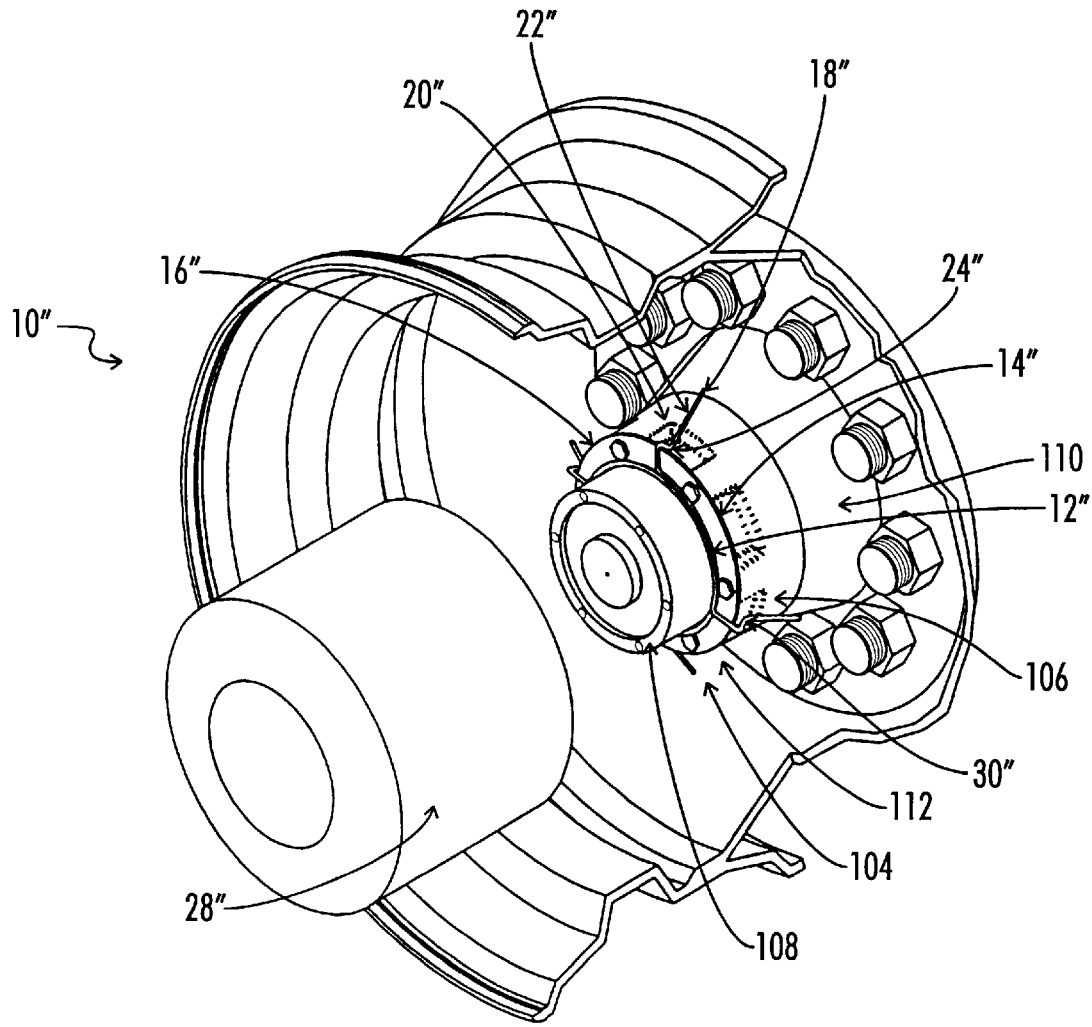
FIG. 5 is a perspective exploded view showing another embodiment of the clip mechanism attached to a hub.

Referring now to FIG. 5, there is shown generally at 10" still another embodiment of the x-clip system of the present invention. In this particular embodiment, hub 110 has face 108 and ridge 112. Unfortunately, some hubs 110 have insufficient lip 106 to engage a clip or insufficient access to face 108 to allow an x-clip to pass across. Therefore, clip mechanism 12" consists of first clip 14" and second clip 16. Each clip 14", 16" has opposed ends 18" having outward curve 20", inward curve 22", and flange 24". Flange 24 frictionally engages the inside of hub cover/wheel liner 28" of system 10". For additional support, interior curve 30" is provided to pass along hub 110 proximal ridge 112. Interior curve 30 of clip 14", 16" can be malleable so that it may be bent to be formed along hub 110 proximal to hub 110 proximal to ridge 112 and can be placed between bolts 104 and hub 110 if rim allows. Conversely, the frictional attachment of inner curve 22" can hold clip 14", 16" in place.

Thus, although there have been described particular embodiments of the present invention of a new and useful system for attaching a wheel liner to a wheel using a clip, it is not intended that such references be construed as limitations upon the scope of this invention except as set forth in the following claims.

What is claimed is:

1. A system for attaching a hub cover to a wheel having a hub, said hub having a continuous side, said system comprising a clip mechanism having a first clip and a second clip, each of said clips having opposed ends, each of said opposed ends having an inward curve releasably engageable to said side of said hub and an outward curve releasably engageable to said hub cover.

2. The system of claim 1 wherein said first clip is perpendicular to said second clip.

3. The system of claim 1 wherein each of said first clip and said second clip are placeable along said hub proximal a lip.

4. The system of claim 3 wherein said hub includes plural bolts wherein jam nuts are provided for attaching said clip mechansim to said plural bolts.

* * * * *